United States Patent [19]

Kato

[11] Patent Number: 4,543,480
[45] Date of Patent: Sep. 24, 1985

[54] RADIATION IMAGE RECORDING SYSTEM

[75] Inventor: Hisatoyo Kato, Minami-ashigara, Japan

[73] Assignee: Fuji Photo Film Co. Ltd., Kanagawa, Japan

[21] Appl. No.: 433,718

[22] Filed: Oct. 12, 1982

[30] Foreign Application Priority Data

Oct. 16, 1981 [JP] Japan ................... 56-165117

[51] Int. Cl.$^4$ ............................................. G03C 5/16
[52] U.S. Cl. ................... 250/327.2; 250/484.1
[58] Field of Search ................ 250/319, 327.2, 484.1, 250/337; 378/173, 171

[56] References Cited

U.S. PATENT DOCUMENTS

| 3,128,379 | 4/1964 | Cisek et al. | 250/319 |
| 3,567,931 | 3/1971 | Eelkema | 378/171 |
| 4,199,687 | 4/1980 | Brendl et al. | 378/173 |
| 4,400,619 | 8/1983 | Kotera et al. | 250/484.1 |
| 4,438,333 | 3/1984 | Teraoka et al. | 250/327.2 |

FOREIGN PATENT DOCUMENTS 56639 7/1982 European Pat. Off. ........... 250/319

Primary Examiner—Alfred E. Smith
Assistant Examiner—Carolyn E. Fields
Attorney, Agent, or Firm—Murray, Whisenhunt & Ferguson

[57] ABSTRACT

In a radiation image recording system in which a radiation image is once recorded on a stimulable phosphor sheet and then read out and reproduced into a visible radiation image, a high-power light source is built in the system to erase the noise due to the previously stored radiation image and the fog in the phosphor sheet by a single erasing operation immediately before the phosphor sheet is to be used to record thereon a radiation image. The light source has an exposure amount of at least 500,000 lx·sec. and is positioned between a phosphor sheet feeding section and a section where a radiation image is recorded on the sheet. The system is also provided with a mechanism for sending the phosphor sheet from the recording section to a sheet receiver or radiation image read out and reproducing apparatus.

14 Claims, 6 Drawing Figures

RADIATION IMAGE RECORDING SYSTEM

BACKGROUND OF THE INVENTION

1. Field of the Invention

This invention relates to a radiation image recording system which can carry out noise-free radiation image recording by effectively erasing the noise developing in a visible image reproduced from a stimulable phosphor sheet carrying a radiation image. This invention particularly relates to a radiation image recording system which can carry out noise-free radiation image recording by effectively erasing the noise developing in such a reproduced visible image due to repeated use of the stimulable phosphor sheet in a radiation image information recording and reproducing method where the stimulable phosphor sheet is exposed to a radiation to record a radiation image therein and then exposed to a stimulating ray to emit light in the pattern of the stored image, the emitted light is converted to an electric signal, and a visible image corresponding to the radiation image is reproduced by use of the electric signal.

2. Description of the Prior Art

When certain kinds of phosphors are exposed to such radiation as X-rays, $\alpha$-rays, $\beta$-rays, $\gamma$-rays or ultraviolet rays, they store a part of the energy of the radiation. Then, when the phosphor which has been exposed to the radiation is exposed to a stimulating ray such as visible ray, light is emitted from the phosphor in the pattern of the stored energy of the radiation. A phosphor exhibiting such properties is referred to as a stimulable phosphor.

As disclosed in U.S. Pat. Nos. 4,258,264, 4,315,318, 4,340,911 and 4,387,428 and Japanese Unexamined Patent Publication No. 56(1981)-11395, it has been proposed to use the stimulable phosphor for recording a radiation image of the human body for medical diagnosis. Specifically, the stimulable phosphor is first exposed to a radiation to have a radiation image stored therein, and is then scanned with a stimulating ray which causes it to emit light in the pattern of the stored image. The light emitted from the stimulable phosphor upon stimulation thereof is photoelectrically detected and converted to an electric image signal, which is processed as desired to reproduce a visible image of a quality suitable for viewing and diagnostic purposes.

In the radiation image recording and reproducing method described above, the final visible image may be reproduced in the form of a hard copy or may be displayed on a cathode ray tube. The stimulable phosphor sheet used in this method may be in any of various forms such as a panel, drum or the like, which are herein generally referred to as sheets. For economical reasons, it is desirable that the stimulable phosphor sheet be used repeatedly in many separate radiographic operations.

In order to reuse the stimulable phosphor sheet, it is necessary that the stimulable phosphor sheet to be reused be made completely free from the previously stored radiation image. Theoretically, the radiation energy of the radiation image stored in the stimulable phosphor sheet should disappear when the sheet is scanned with a stimulating ray of a sufficient intensity to cause light to emit therefrom in the pattern of the stored radiation image in the course of the radiation image recording and reproducing process as described above. Actually, however, the stored radiation energy cannot be completely eliminated only with the stimulating ray used to scan the stimulable phosphor sheet during the aforesaid process. Thus a part of the previously stored radiation image remains in the reused stimulable phosphor sheet and inconveniently causes noise to occur in the visible image reproduced from the reused stimulable phosphor sheet. In order to successfully reuse the stimulable phosphor sheet, any such residual radiation image thereon must be erased completely before reuse.

Further, a stimulable phosphor contains a trace of radioactive isotopes such as $^{226}$Ra and $^{40}$K, which emit radiations and cause the stimulable phosphor sheet to store the emitted radiation energy even when the sheet is not being used in radiography. These traces of radioactive isotopes also constitute a cause of the noise developing in the reproduced visible radiation image. Furthermore, a stimulable phosphor sheet is also affected by environmental radiations such as cosmic rays and X-rays emitted from other X-ray sources and stores the energy thereof. These types of radiation energy (hereinafter referred to as fog) undesirably stored in the stimulable phosphor sheet also cause noise to appear in the visible radiation image reproduced from a reused stimulable phosphor sheet and, therefore, must be erased before reusing the stimulable phosphor sheet.

In order to avoid noise occurring in the reproduced visible radiation image due to the noise originating from the radiation image previously stored in a stimulable phosphor sheet and due to the fog developing during the storage of the sheet, the Applicant has proposed in his U.S. Pat. No. 4,400,619 to stimulate the stimulable phosphor sheet by use of light of wavelengths including the wavelength range of the stimulating ray for the phosphor before storing a radiation image in the stimulable phosphor sheet, thereby to discharge the detrimental radiation energy therefrom to an acceptable extent.

With this method, however, erasing of the residual radiation image and fog in the stimulable phosphor sheet must be effected immediately before using the sheet for radiography. This is necessary to minimize the fog developing in the stimulable phosphor sheet after the erasing is conducted.

The inventors conducted experiments to find what levels of radiation energy of the residual image and the fog in the reused phosphor caused noise to develop in the reproduced visible radiation image to an extent adversely affecting diagnosis. From the results of these experiments, it has been found that, in order to eliminate the detrimental noise due to the residual image, the radiation energy of the radiation image stored in the phosphor must be erased to the order of $10^{-4}$ to $10^{-6}$. Stated differently, the original radiation energy stored in the phosphor must be erased to a level between 0.01 and 0.0001 when the maximum of the original level is 100. On the other hand, the level of the fog developing in the phosphor is generally about 0.1 to 0.001 based on the maximum of the stored original radiation energy which is taken as 100 as described above. It has also been found that the fog must be erased to a level between about 0.01 and 0.0001 in order to prevent the fog from developing detrimental noise in the next radiographic operation.

However, in order to erase the radiation energy of the previously stored radiation image to the order of $10^{-4}$ to $10^{-6}$, the phosphor must be exposed to a high illuminance for a long length of time, for example to 30,000 lx for 100 to 1,000 seconds using a tungsten-filament lamp. This necessitates a large-scale erasing apparatus and, in addition, erasing must be started a considerable length of time before a radiograph is to be taken. Thus it is very difficult in practical use to carry out such a troublesome erasing operation each time a radiograph is to be taken. Further, it is very inconvenient in practical use to instal a large-scale erasing apparatus in the vicinity of the radiographic equipment.

The inventors conducted various experiments with respect to the aforesaid two kinds of causes of noise, and have found that the erasability thereof differs considerably between the residual radiation image having a level of radiation energy of about 0.1, which remains in a stimulable phosphor after the radiation energy of the previously stored image is erased from the level of 100 to about 0.1, and the fog accumulated in the stimulable phosphor to a level of about 0.1 when the phosphor is allowed to stand, even though the level of radiation energy is the same. That is to say, after the previously stored image is erased from the level of 100 to about 0.1, the resulting residual image suddenly becomes difficult to erase. For example, the previously stored image can be erased to a level of about 0.1 when exposed to light at an illuminance of 10,000 lx for about 10 seconds, but it takes about 100 seconds for the resulting residual image to be further erased to a level of 0.01. In contrast, the fog of the level of about 0.1 can be erased in less than 1 second at an illuminance of 10,000 lx.

Based on the above-mentioned observations, the inventors have already proposed in U.S. Pat. No. 4,439,682 a noise erasing method comprising two erasing steps wherein the first erasing which requires a long period of time to erase the previously stored image is carried out at an appropriate point of time after the radiation image is stored in a stimulable phosphor and scannned with a stimulating ray, and the second erasing for the fog which can be erased quickly is conducted immediately before the next radiographic operation.

According to this proposed method, the first erasing in which the radiation image previously stored in the stimulable phosphor is to be erased at a high illuminance for a long period of time by use of a large-scale apparatus can be carried out at an appropriate point of time after the stimulable phosphor sheet has been used for a radiographic operation. After the first erasing is finished, the stimulable phosphor sheet can be transferred to the vicinity of the site where it is to be used for the next radiographic operation. Thereafter, immediately before the next radiographic operation is to be started, the second erasing can be conducted for a short length of time to erase the fog, if any, by use of a simple small-scale apparatus. Thus this method can effectively eliminate the causes of noise and provide a noise-free reproduced visible radiation image.

However, fog develops if the stimulable phosphor sheet is allowed to stand for a long period after the second erasing is conducted. Therefore, it is preferred that the stimulable phosphor sheet be used for the next recording of a radiation image as soon as possible after the second erasing is conducted. Most preferably, the second erasing should be conducted just prior to the next recording of a radiation image. Namely, it is most preferable that a means for the second erasing be incorporated in the radiation image recording system.

Under the above circumstances, the inventors have proposed in U.S. patent application Ser. No. 339,797 to incorporate a second erasing means in the radiation image recording system.

However, the above-mentioned system requires two erasing operations using two kinds of separate apparatus for the first and second erasing operations, and therefore is expensive and troublesome.

SUMMARY OF THE INVENTION

The primary object of the present invention is to provide a radiation image recording system which can easily erase noise due to the radiation image previously stored and fog in a stimulable phosphor sheet by a single erasing operation.

Another object of the present invention is to provide a radiation image recording system which can effectively erase the noise in a stimulable phosphor sheet immediately before the stimulable phosphor sheet is to be used to record thereon a radiation image.

A further object of the present invention is to provide a radiation image recording system which can provide a noise-free, sharp radiation image.

Recently, it became possible to obtain a high illuminance by use of a small illuminant (or lamp) and, consequently, to relatively quickly conduct the first erasing by use of a small apparatus.

Accordingly, the radiation image recording system in accordance with the present invention comprises a sheet feed body fitting section which releasably holds a sheet feed body containing stimulable phosphor sheets or a continuous stimulable phosphor sheet used for the radiation image recording and reproduction or a sheet feeding section containing said stimulable phosphor sheets or said continuous stimulable phosphor sheet, a stimulable phosphor sheet supplying means for supplying each said stimulable phosphor sheet or predetermined lengths of said continuous stimulable phosphor sheet from said fitted sheet feed body or said sheet feeding section to a recording position, a stimulable phosphor sheet holding means for holding said stimulable phosphor sheet in said recording position, a sheet delivery means for ejecting said stimulable phosphor sheet from said recording position after a radiation image is recorded on said stimulable phosphor sheet and for deliverying it to a sheet receiving section or a radiation image information read out and reproducing system, and an irradiation means which is used to erase the noise in said stimulable phopshor sheet and which is provided between said sheet feed body fitting section or said sheet feeding section and said stimulable phosphor sheet holding means, said irradiation means for erasing the noise having an exposure amount of 500,000 lx·sec. or more. The system in accordance with the present invention can easily erase the noise due to the previously stored radiation image and the fog by a single erasing operation. Further, since the erasing is conducted immediately before the stimulable phosphor sheet is to be used to record thereon a radiation image, there is no risk of fog developing thereon after the erasing operation. Accordingly, the system in accordance with the present invention can yield a noise-free, sharp visible image. Further, the system is economically advantageous since only one erasing apparatus is used.

The exposure amount to be used for erasing the noise varies according to the sensitivity of the stimulable phosphor used. In general, however, it is at least 500,000 lx·sec., preferably from 3,000,000 to 9,000,000 lx·sec., when the previously stored image should be erased to a level between 0.01 and 0.001. The term "exposure amount" as used herein means the illuminance of the erasing light multiplied by the time the stimulable phosphor is exposed to the erasing light.

Of course, the power of the light source and the time during which the stimulable phosphor is exposed thereto may be selected freely, provided that an exposure amount within the aforesaid range is secured.

For instance, in the case of a 356 mm × 432 mm stimulable phosphor sheet, the aforesaid preferable range of exposure, i.e., from 3,000,000 to 9,000,000 lx·sec., can be achieved by exposing the stimulable phosphor sheet to a 10 kW lamp for at least 7.5 seconds and to 20 kW lamp for at most 10 seconds. The exposure amount of 500,000 lx·sec. which is the minimum necessary value for erasing the noise can be achieved by exposing the stimulable phosphor sheet to a 10 kW lamp for 1.3 seconds.

DESCRIPTION OF PREFERRED EMBODIMENTS

The present invention will hereinbelow be described in further detail with reference to the accompanying drawings.

Figure 1:
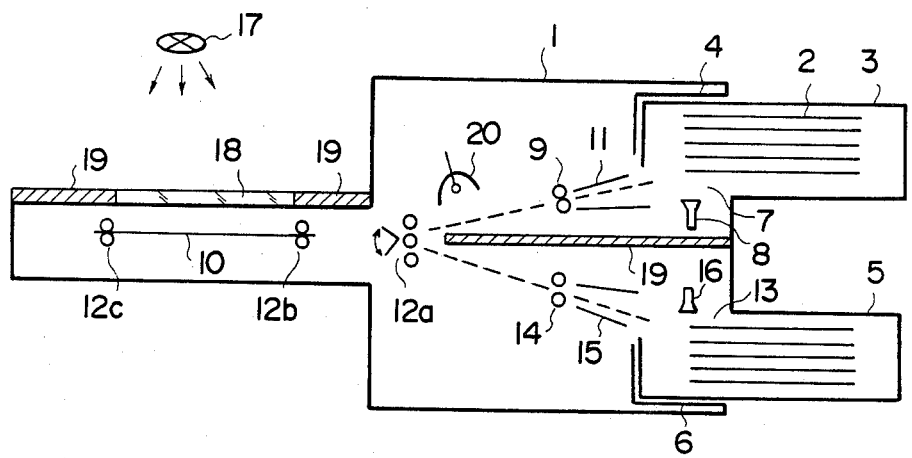
FIG. 1 is a schematic view showing the first embodiment of the radiation image recording system in accordance with the present invention.

FIG. 1 shows the first embodiment of the radiation image recording system in accordance with the present invention in which discrete stimulable phosphor sheets 2 are used.

In FIG. 1, a feed magazine fitting section 4 which releasably holds a feed magazine 3 capable of accommodating a plurality of stimulable phosphor sheets 2 is positioned at the upper section of a radiation image recording system body 1. At the lower section of the body 1 is positioned a receiving magazine fitting section 6 which releasably holds a receiving magazine 5 for receiving the respective stimulable phosphor sheets 2 after radiation images have been recorded therein. In the vicinity of an aperture 7 of the feed magazine 3 is positioned a take-up arm 8 which, using suction, takes up the stimulable phosphor sheets 2 one at a time from the aperture 7 of the feed magazine 3 fitted to the feed magazine fitting section 4. Below the feed magazine fitting section 4 are positioned sheet feed rollers 9, which receive the sheet 2 taken out of the feed magazine 3 by the take-up arm 8 and carry it toward a radiation image recording position 10, and feed guide plates 11 for guiding the sheet 2 to the sheet feed rollers 9. At the recording position 10 are provided a series of sheet loading and unloading rollers 12a, 12b and 12c which load the sheet 2 to and hold it at the recording position 10. Sheet receiving rollers 14 and receiving guide plates 15 are located above the receiving magazine fitting section 6 to move the sheet 2 taken out of the recording position 10 up to an aperture 13 of the receiving magazine 5. In the vicinity of the aperture 13 of the receiving magazine 5 is positioned a receiving arm 16 which sucks the sheet 2 through the aperture 13 and sets it into the receiving magazine 5. At the recording position 10 is provided a radiation transmitting window 18 made of a material which transmits a radiation emitted from a radiation source 17 but shields light of wavelengths including the wavelength range of the stimulating ray for the stimulable phosphor. Shield plates 19 are provided at the necessary sections of the body 1 so as to prevent the stimulable phosphor sheet 2 from being exposed to radiation and stray light of wavelengths including the wavelength range of the stimulating ray.

Further, an illuminant 20 for erasing noise is located between the feed magazine fitting section 4 and the sheet loading and unloading rollers 12a. The illuminant 20 may for example be a tungsten-filament, fluorescent, sodium, xenon or iodine lamp or the like. The feed rollers 9, receiving rollers 14, and sheet loading and unloading rollers 12a, 12b, 12c may each be replaced by a belt, chain or the like which can move the sheets 2 at a predetermined speed. The take-up arm 8 may be replaced by any other means which can take up the sheets 2 one at a time from the feed magazine 3. This also applies to the receiving arm 16. A plurality of stimulable phosphor sheets 2 contained in the feed magazine 3 are sucked and taken up one at a time by the take-up arm 8. The illuminant 20 is synchronized with the movement of the stimulable phosphor sheets 2 so as to start emitting light when the forward end of each sheet 2 taken out of the feed magazine 3 reaches the feed rollers 9. The sheet 2 is exposed to light emitted from the illuminant 20 while it is passed under the illuminant 20 at a predetermined speed by the feed rollers 9 and the loading and unloading rollers 12a. At this time, the exposure amount for the stimulable phosphor sheet is set at 500,000 lx·sec. or more, preferably from 3,000,000 to 9,000,000 lx·sec. The stimulable phosphor sheet 2 is then carried to and held at the recording position 10 by a series of sheet loading and unloading rollers 12a, 12b and 12c. After a radiation image is recorded on the stimulable phosphor sheet 2, the sheet 2 is taken out of the recording position 10 by the loading and unloading rollers 12a, 12b, 12c, and set into the receiving magazine 5 by the receiving rollers 14 and the receiving arm 16. In this embodiment of the present invention, the stimulable phosphor sheet 2 is passed under the illuminant 20 at a predetermined speed, so that the whole surface thereof is uniformly exposed to light emitted from the illuminant 20.

In the above-described embodiment, the speed of the feed rollers 9 to carry the stimulable phosphor sheet 2 must be controlled with respect to the light irradiation power of the illuminant 20 so as to secure an exposure amount within the aforesaid range. It is also possible to have the illuminant 20 turned on continuously, instead of operating it in synchronization with the movement of the stimulable phosphor sheets 2. In this case, however, it is necessary to provide a means for shielding the radiation image recording position 10 and the region downstream therefrom from the light emitted from the illuminant 20.

Figure 2:
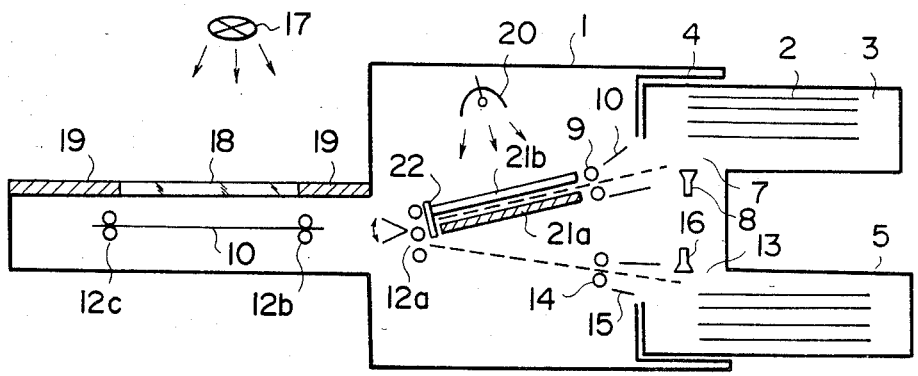
FIG. 2 is a schematic view showing the second embodiment of the radiation image recording system in accordance with the present invention.

FIG. 2 shows the second embodiment of the radiation image recording system in accordance with the present invention. This second embodiment differs from the first described above in that a pair of supporting plates 21a, 21b are used to guide and support the stimulable phosphor sheets 2 under the illuminant 20 (the supporting plate 21b located on the side of the illuminant 20 is transparent, while the supporting plate 21a on the opposite side serves as a shielding plate), in that a stopper 22 is provided to hold the stimulable phosphor sheets 2 under the illuminant 20, and in that the illuminant 20 may be a flashlamp. A plurality of stimulable phosphor sheets 2 contained in the feed magazine 3 are sucked and taken up one at a time by the take-up arm 8. The taken-up sheet 2 is moved by the feed rollers 9 and stopped by the stopper 22 with the forward end thereof contacting the stopper 22. In this way, the sheet 2 is supported on the supporting plate 21a. In this condition, the stimulable phosphor sheet 2 is exposed to light emitted from the illuminant 20 through the transparent supporting plate 21b. At this time, the exposure amount is set at 500,000 lx·sec. or more, preferably from 3,000,000 to 9,000,000 lx·sec. When the irradiation is finished, the stopper 22 is retracted, and the stimulable phosphor sheet 2 is moved to the recording position 10 by the sheet loading and unloading rollers 12a, 12b, 12c. In this second embodiment of the present invention, a high brightness flashlamp can be used as the illuminant 20.

Figure 3:
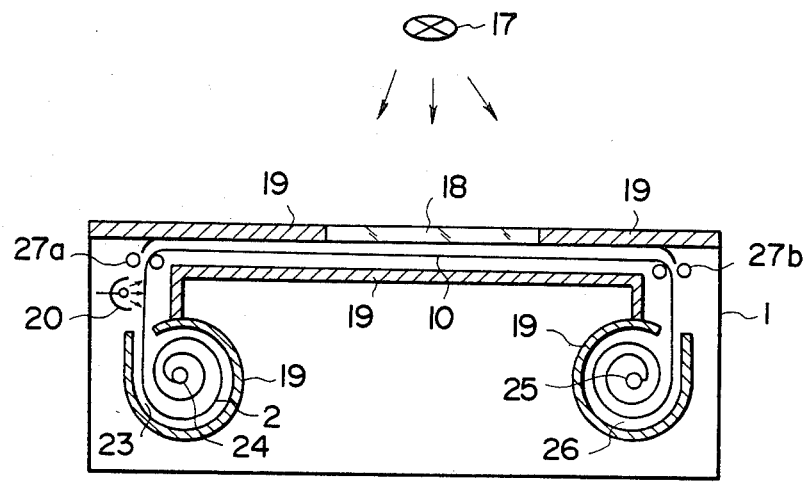
FIG. 3 is schematic view showing the third embodiment of the radiation image recording system in accordance with the present invention.

In FIG. 3 showing the third embodiment of the radiation image recording system in accordance with the present invention, a strip-shaped stimulable phosphor sheet 2 is used. At one side in the body 1 is positioned a sheet feed body fitting section 24 which releasably holds a sheet feed body 23 containing the rolled stimulable phosphor sheet 2. At the other side in the body 1 is located a sheet receiving section 26 having a wind-up shaft 25 for winding up the strip-shaped stimulable phosphor sheet 2 in the roll form after a radiation image is recorded thereon. Two sets of sheet holding rollers 27a, 27b are positioned above the sheet feed body fitting section 24 and the wind-up shaft 25 so as to hold the stimulable phosphor sheet 2. At the recording position 10 is provided a radiation transmitting window 18 made of a material which transmits a radiation emitted from the radiation source 17 but shields light of wavelengths including the wavelength range of the stimulating ray for the stimulable phosphor. Shield plates 19 are located around the sheet feed body fitting section 24 and the sheet receiving section 26 as well as other sections requiring shielding so as to prevent the stimulable phosphor sheet 2 from being exposed to radiation and stray light of wavelengths including the wavelength range of the stimulating ray for the stimulable phosphor. Further, the illuminant 20 for erasing noise is located between the sheet feed body fitting section 24 and the sheet holding rollers 27a.

In the third embodiment of the present invention, one end of the stimulable phosphor sheet 2 rolled in the sheet feed body 23 is fitted to the wind-up shaft 25. Then the wind-up shaft 25 is rotated to wind up the stimulable phosphor sheet 2 until a predetermined length thereof is pulled out of the sheet feed body 23. At this time, the illuminant 20 for erasing noise is turned on to emit light and erase the noise stored in the stimulable phosphor sheet 2. After a radiation image is recorded on the stimulable phosphor sheet 2 at the recording position 10, the sheet 2 is wound up around the wind-up shaft 25 and accommodated in the receiving section 26. At the same time, another portion of the stimulable phosphor sheet 2 from which the noise has been erased by the illuminant 20 is passed to the recording position 10. After radiation images are recorded over the entire length of the stimulable phosphor sheet 2, the sheet 2 is completely wound up arround the wind-up shaft 25 and ejected from the sheet receiving section 26 together with the wind-up shaft 25, or is rewound into the sheet feed body 23 and ejected from the sheet feed body fitting section 24 in the form of a roll.

In this third embodiment of the present invention, the illuminant 20 is intermittently turned on to erase the noise in the stimulable phosphor sheet 2. However, it is also possible, although not economical, to have it turned on continuously because an excessive exposure amount for erasing the noise does not adversely affect the stimulable phosphor sheet 2.

Figure 4:
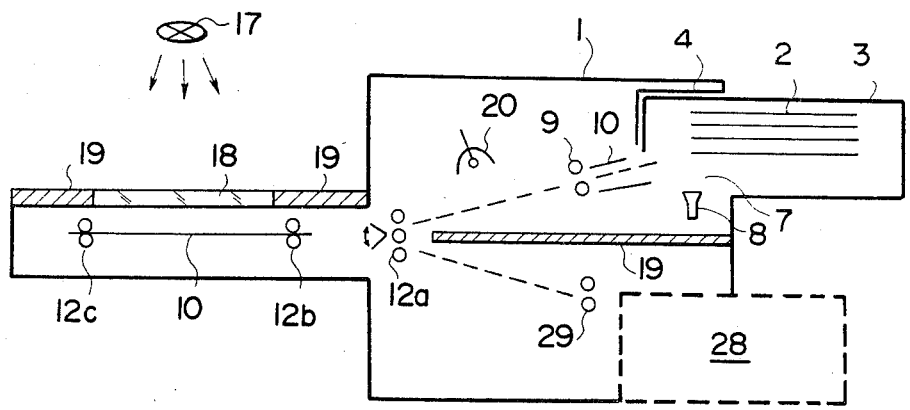
FIG. 4 is a schematic view showing the fourth embodiment of the radiation image recording system in accordance with the present invetion.

FIG. 4 shows the fourth embodiment of the radiation image recording system in accordance with the present invention. This fourth embodiment differs from the first embodiment described above in that the receiving magazine fitting section 6, receiving arm 16, sheet receiving rollers 14 and receiving guide plates 15 in the first embodiment are omitted, and in that delivery rollers 29 are provided for sending the stimulable phosphor sheet 2 directly to a radiation image information read out and reproducing system 28 after a radiation image has been recorded on the sheet 2. The stimulable phosphor sheet 2 on which a radiation image has been recorded in the same manner as in the first embodiment is directly sent to the read out system 28, which has a means for irradiating a stimulating ray for reading out the recorded radiation image, a means for detecting the light emitted from the stimulable phosphor sheet 2 upon stimulation thereof or the like, by the delivery rollers 29.

Figure 5:
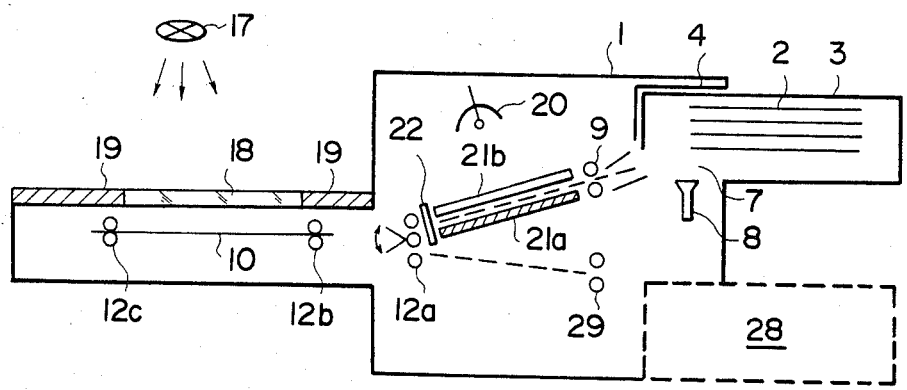
FIG. 5 is a schematic view showing the fifth embodiment of the radiation image recording system in accordance with the present invention.

FIG. 5 shows the fifth embodiment in accordance with the present invention. Like the fourth embodiment described above, this fifth embodiment differs from the second embodiment in that the receiving magazine fitting section 6, receiving arm 16, sheet receiving rollers 14 and receiving guide plates 15 in the second embodiment are omitted, and in that delivery rollers 29 are provided for sending the stimulable phosphor sheet 2 directly to a radiation image information read out and reproducing system 28 after a radiation image has been recorded on the sheet 2.

Figure 6:
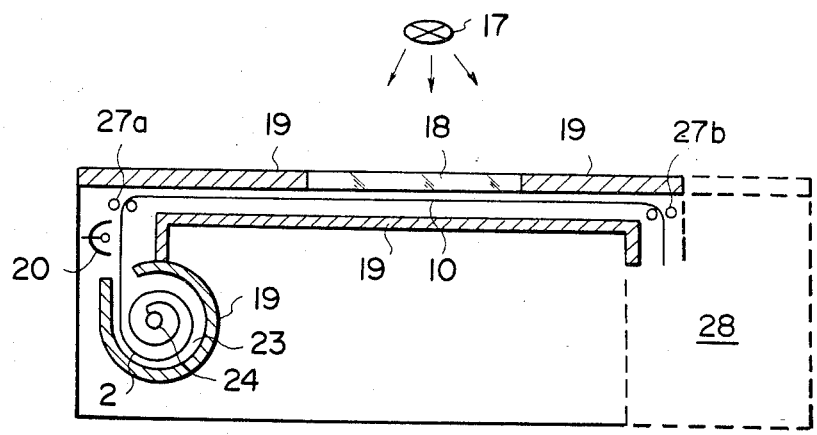
FIG. 6 is a schematic view showing the sixth embodiment of the radiation image recording system in accordance with the present invention.

FIG. 6 shows the sixth embodiment in accordance with the present invention. This sixth embodiment differs from the third embodiment described above in that there are no wind-up shaft 25 or sheet receiving section 26. In this embodiment, the stimulable phosphor sheet 2 on which a radiation image has been recorded in directly sent to a radiation image information read out and reproducing system 28.

I claim:

1. A radiation image recording system comprising:
   (a) a container means for containing stimulable phosphor sheets or a continuous stimulable phosphor sheet used for radiation image recording and reproduction;
   (b) a stimulable phosphor sheet supplying means for supplying each said stimulable phosphor sheet or predetermined lengths of said continuous phosphor sheet from said container means to a recording position;
   (c) a stimulable phosphor sheet holding means for holding said stimulable phosphor sheet in said recording position;
   (d) a sheet delivery means for ejecting said stimulable phosphor sheet from said recording position after a radiation image is recorded on said stimulable phosphor sheet and for delivering it to a sheet receiving section or a radiation image information read out and reproducing system;

(e) an irradiation means which is provided between said container means and said stimulable phosphor sheet holding means for erasing noise in said stimulable phosphor sheet, said irradiation means having an exposure amount of 500,000 lx·sec. or more.

2. A radiation image recording system as defined in claim 1 wherein said irradiation means has an exposure amount ranging from 3,000,000 to 9,000,000 lx·sec.

3. A radiation image recording system as defined in claim 1 wherein said stimulable phosphor sheet supplying means is provided with a guiding means for guiding said stimulable phosphor sheets from said container means to said supplying means.

4. A radiation image recording system as defined in claim 1 wherein the sheet carrying speed of said stimulable phosphor sheet supplying means is controlled with respect to the power of said irradiation means so as to secure a predetermined exposure amount.

5. A radiation image recording system as defined in claim 1 wherein said stimulable phosphor sheet supplying means is provided with a means for taking up said stimulable phosphor sheets one at a time from said container means.

6. A radiation image recording system as defined in claim 1 wherein said stimulable phosphor sheet supplying means is provided with a supporting means for guiding and supporting said stimulable phosphor sheets between said container means and said stimulable phosphor sheet holding means.

7. A radiation image recording system as defined in claim 6 wherein said supporting means consists of a pair of plates, one of which is transparent.

8. A radiation image recording system as defined in claim 7 wherein said transparent plate of said pair of plates is positioned on the side nearer to said irradiation means than the other.

9. A radiation image recording system as defined in claim 6 wherein said supporting means is provided with, at or in the vicinity of its one end, a stopper means for holding said stimulable phosphor sheets in a predetermined position.

10. A radiation image recording system as defined in claim 1 wherein said stimulable phosphor sheet is in the form of a continuous sheet and said sheet delivery means also serves as said stimulable phosphor sheet supplying means.

11. A radiation image recording system as defined in claim 10 wherein said sheet delivery means comprises a wind-up shaft for winding the continuous sheet around it.

12. A radiation image recording system as defined in claim 1 wherein said stimulable phosphor sheet is in the form of a continuous sheet and said stimulable phosphor sheet holding means also serves as said stimulable phosphor sheet supplying means and said sheet delivery means.

13. A radiation image recording system as defined in claim 1, wherein said container means comprises a section for releaseably holding a sheet feed body containing said stimulable phosphor sheets or said continuous stimulable phosphor sheet.

14. A radiation image recording system as defined in claim 1, wherein said container means comprises a sheet feeding section containing said stimulable phosphor sheets or said continuous stimulable phosphor sheet.

* * * * *